United States Patent [19]

Greenwood

[11] Patent Number: 5,247,704
[45] Date of Patent: Sep. 21, 1993

[54] BURST MODE TRANSMITTER/RECEIVER UNIT

[76] Inventor: Martin Greenwood, 40 Bushmead Avenue, Bedford, MK40 3QN, United Kingdom

[21] Appl. No.: 544,326

[22] Filed: Jun. 27, 1990

[30] Foreign Application Priority Data

Jun. 29, 1989 [GB] United Kingdom ............... 8914888

[51] Int. Cl.⁵ .............................................. H04B 1/38
[52] U.S. Cl. ..................................... 455/73; 455/117; 455/127
[58] Field of Search ................. 455/73, 117, 127, 343

[56] References Cited

U.S. PATENT DOCUMENTS

| | | | |
|---|---|---|---|
| 4,502,152 | 2/1985 | Sinclair | 455/127 |
| 4,532,930 | 8/1985 | Crosby et al. | 128/419 |
| 4,682,369 | 7/1987 | Schrader | 455/127 |

FOREIGN PATENT DOCUMENTS 0144131  7/1986  Japan ..................... 455/127

Primary Examiner—Curtis Kuntz
Assistant Examiner—Christine K. Belzer
Attorney, Agent, or Firm—Lee, Mann, Smith, McWilliams, Sweeney & Ohlson

[57] ABSTRACT

A cordless telephone handset includes a burst mode transmitter/receiver unit comprising a radio (10) and a current sink (20) shunted across the radio. A controller (18) controls the current sink (20) in a feedback manner such that the sum of the currents drawn by the radio and the current sink is substantially constant, in order to compensate for fluctuations in the current drawn by the radio alone, so as to avoid interference at the burst rate when the handset is used in conjunction with a hearing aid.

6 Claims, 1 Drawing Sheet

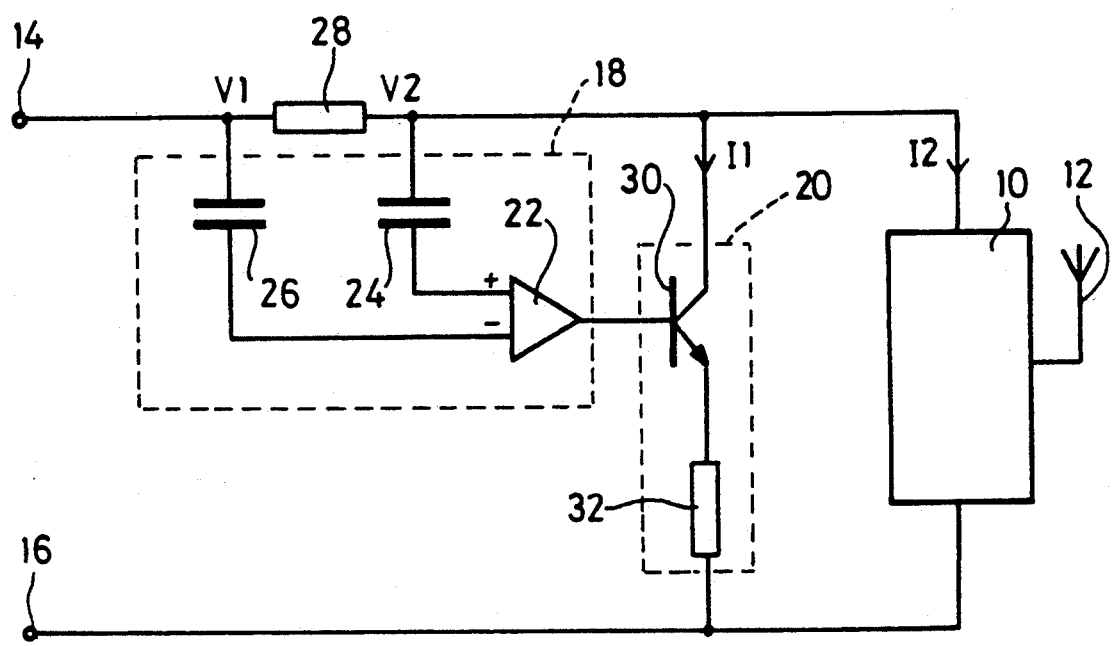

BURST MODE TRANSMITTER/RECEIVER UNIT

FIELD OF THE INVENTION

This invention relates to a burst mode transmitter/receiver unit.

BACKGROUND TO THE INVENTION

Inductive coupling has been used for many years to enable users of hearing aids to listen to public address systems or to use telephone receivers clearly and with the exclusion of interfering sounds. Inductive coupling works by setting up a magnetic field, the intensity of which fluctuates with time, in proportion to the audio signal. The magnetic field is converted to an electrical signal within the hearing aid and then amplified to produce an audible output.

Cordless telephones have become popular in recent years and look set to become even more popular in the future. There are, however, certain technical problems which make it difficult to adapt cordless telephones for use with hearing aids by inductive coupling.

One particular class of cordless telephones, shortly to be launched in the UK and going under the code name of "CT2" uses a system called "burst mode duplex". The same radio channel is used for both transmission and reception, with the two radios at the ends of the communication link alternately transmitting a burst of information. The process of burst mode duplexing (sometimes called "ping-pong" or "time division duplex") involves switching the radio transmitter within the handset on and off alternately as the handset first transmits and then receives. In the case of CT2 products, the bursts occur at a rate of 500 per second and the internal current consumption of the handset therefore fluctuates at a rate of 500 Hz.

In attempting to make such a telephone handset compatible with hearing aids it is found that there is a stray magnetic field associated with the fluctuation in power supply current. The sensitivity of the hearing aid and the magnitude of the fluctuation are such that there is substantial interference at the duplexing burst rate. The present invention aims to provide a burst mode transmitter/receiver unit in which interference from this source is suppressed.

SUMMARY OF THE INVENTION

According to the invention a burst mode transmitter/receiver unit comprises a radio and compensating means which compensate for fluctuations in the current drawn by the radio on account of the burst mode operation, wherein the compensating means include a circuit shunted across the radio and controlled such that the sum of the current drawn by the radio and the shunt circuit is substantially constant, or is at least more uniform than the current drawn by the radio alone.

The shunt circuit may include a current sink or current source, preferably controlled by a controller of the compensating means. The controller is preferably responsive to the sum of the currents and controls the current sink or current source in a feedback manner.

The controller may be responsive to the voltage drop across a resistor through which flows the sum of the currents, and the shunt circuit may include a transistor the base of which is connected to the controller.

The invention is applicable to transmitter receiver units which work on time division multiplexing or duplexing.

BRIEF DESCRIPTION OF THE DRAWING

A burst mode transmitter/receiver unit will now be described by way of example with reference to the accompanying drawing FIG. 1 which shows a simplified electrical circuit diagram of the unit.

DESCRIPTION OF PREFERRED EMBODIMENT

The unit is in the form of a cordless telephone handset and comprises a radio 10 (with antenna 12) supplied with power through connections 14, 16. The burst mode operation of the radio 10 causes the current 12 drawn by the radio to fluctuate at the burst frequency, and this fluctuation is compensated by compensating means comprising a controller 18 and a current sink 20. The current drawn by the current sink is designated I1.

The two inputs of an operational amplifier 22 are connected, through respective capacitors 24, 26, across a resistor 28 through which flows the sum of the currents (I1 and I2) drawn by the radio and the current sink 20. The resistor 28 is connected in the positive power lead. The output of the operational amplifier 22 controls a transistor 30 in the current sink 20. The transistor 30 and a resistor 32 are shunted across the radio 10.

The controller 18 detects the voltage across the resistor (which is proportional to the total current I1 and I2) and controls the transistor 30 in such a way that the sum of the currents I1 and I2 is held substantially constant.

The feedback which is applied to control I1 is not affected by the steady state current which is drawn by the radio. It only acts to correct for the variations in current flow which cause audio interference. The power supply to the controller itself (not shown in FIG. 1) is drawn from the radio side of the current sensing resistor so that it can compensate for its own power supply variations.

The circuit connections are made close to the part of the radio whose current fluctuates. This is so that the current loop between the radio and the current sink is kept physically small and the resulting residual interference is kept to a minimum.

Several modifications are possible:

1. The current sensing element need not be a resistor, nor need it be placed in the positive supply lead. Any means of current measurement is permissible.

2. If it is assumed that the voltages across the resistor 28 are V1 and V2 as shown and that the power supply to the equipment has a fairly stable voltage, it is not necessary to measure V1. It is possible to simply measure V2 and regulate I1 in such a way as to achieve a constant voltage, V2.

3. Improved performance of the system can be gained if the duplexing control signal is fed into the controller. This feature has been omitted from the current design for the sake of simplicity but in principle the duplex control signal could forewarn the controller of an impending transient in the power supply to the radio.

4. The controller can have various control strategies. The currently designed system amplifies the a.c. component of the difference between V1 and V2, and drives the current sink with this signal plus a fixed amount (so that the current I1 always flows in the same direction). Alternative strategies might, for instance, adapt to the long term characteristics of the current fluctuation or have an in built oscillator which is timed and amplified to draw current in exact anti-phase with the current consumption of the radio.

5. The method is adaptable to other sources of magnetic interference within a communications product which employs burst mode duplexing or time-division multiple access. Other circuits could be included with the radio for magnetic suppression by this means, or suppressed in their own right.

I claim:

1. A burst mode transmitter/receiver unit operative in time division duplex with bursts of transmission alternating with bursts of reception at a predetermined burst frequency, the unit comprising a radio which draws a first current and compensating means which compensate for fluctuations in the current drawn by the radio, said fluctuations being on account of the burst mode operation and being at the burst mode frequency, wherein the compensating means include a circuit which draws a second current which is shunted across the radio and which is controlled by a controller responsive to a sum of said currents drawn by the radio and the shunt circuit such that the sum of the currents drawn by the radio and the shunt circuit is substantially constant.

2. A burst mode transmitter/receiver unit according to claim 1, wherein the shunt circuit includes a current sink.

3. A burst mode transmitter/receiver unit according to claim 2, wherein the current sink is controlled by the controller of the compensating means.

4. A burst mode transmitter/receiver unit according to claim 3, wherein the controller controls the current sink in a feedback manner.

5. A burst mode transmitter/receiver unit according to claim 3, wherein the controller is responsive to the voltage drop across a resistor through which flows the sum of the currents.

6. A burst mode transmitter/receiver unit according to claim 3, wherein the shunt circuit includes a transistor the base of which is connected to the controller.

* * * * *

UNITED STATES PATENT AND TRADEMARK OFFICE
CERTIFICATE OF CORRECTION

PATENT NO. : 5,247,704

DATED : September 21 1993

INVENTOR(S) : Martin Greenwood

It is certified that error appears in the above-indentified patent and that said Letters Patent is hereby corrected as shown below:

On the title page insert -- [73]   Assignees

Libera Telecom Limited (50% interest)
Manchester, United Kingdom

Kenwood Corporation (50% interest)
Tokyo, Japan                              --

Signed and Sealed this

Thirty-first Day of October 1995

*Attest:*

BRUCE LEHMAN

*Attesting Officer*    Commissioner of Patents and Trademarks